Oct. 9, 1928.
F. M. GILLENWATERS
1,687,475
AUTOMOBILE LOCK
Original Filed Jan. 29, 1924    2 Sheets-Sheet 1
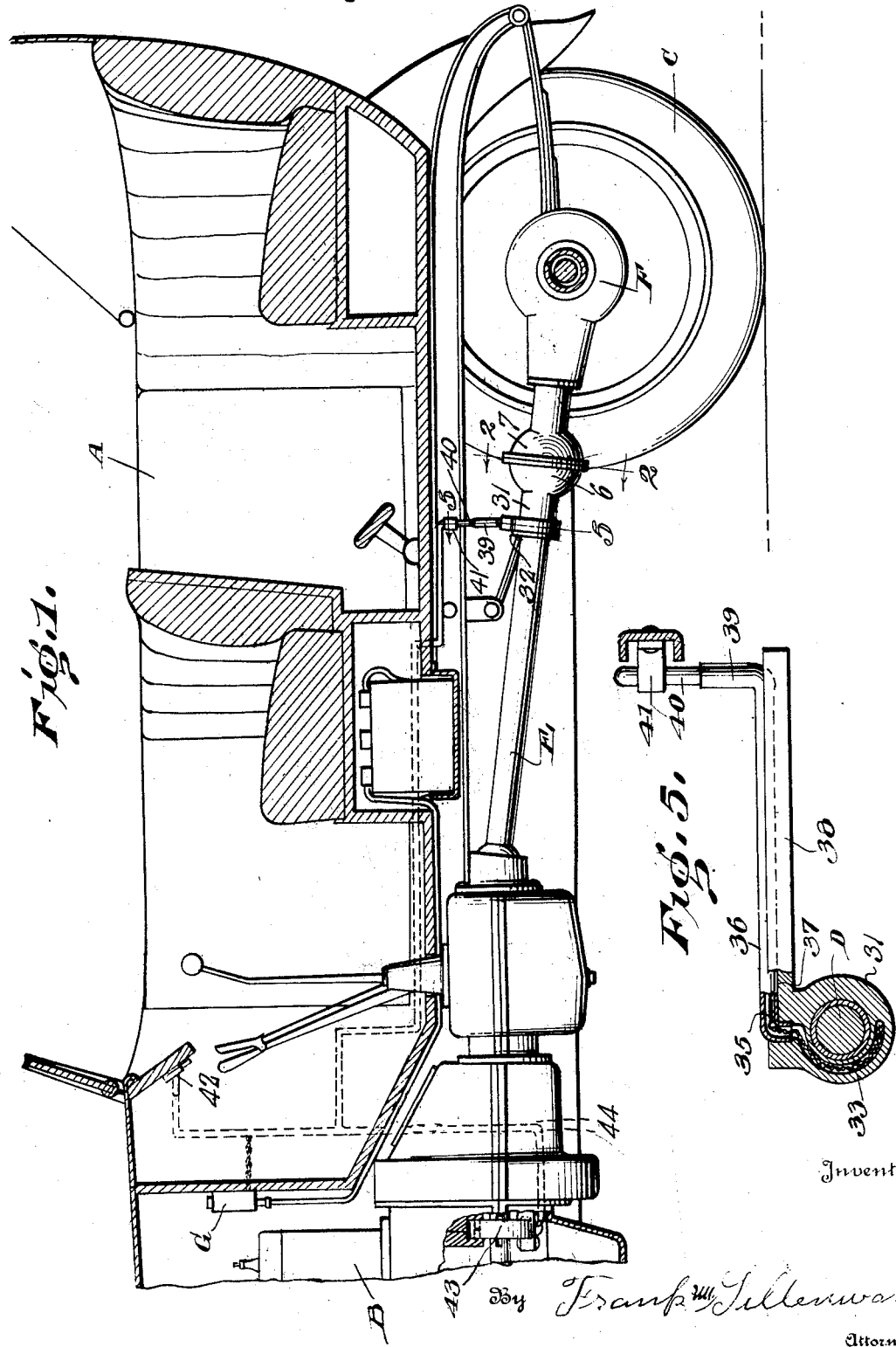

Oct. 9, 1928.
F. M. GILLENWATERS
1,687,475
AUTOMOBILE LOCK
Original Filed Jan. 29, 1924    2 Sheets-Sheet 2
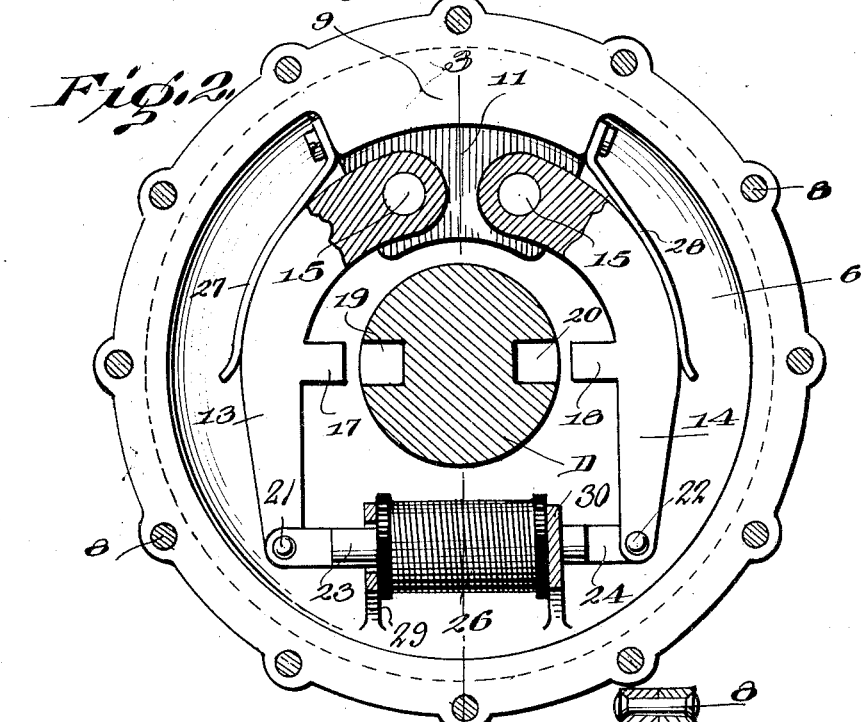
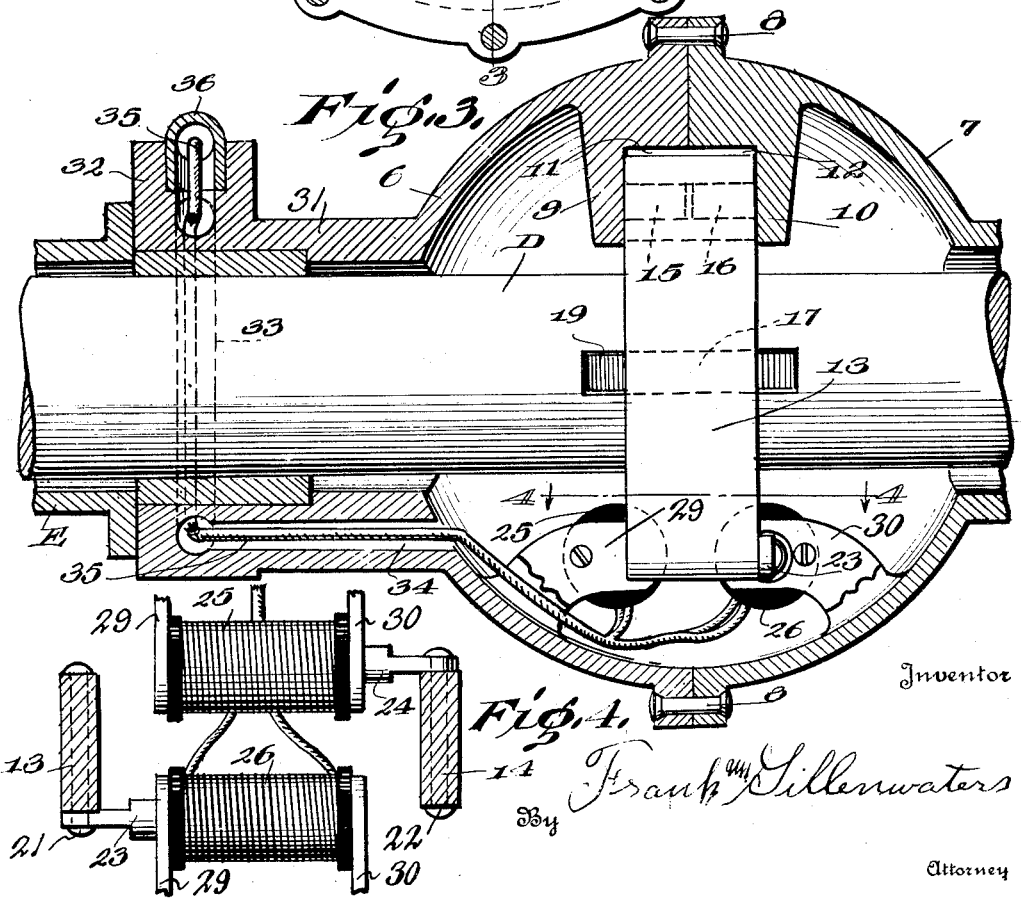
Inventor
Frank M Gillenwaters
By
Attorney Patented Oct. 9, 1928.

1,687,475

UNITED STATES PATENT OFFICE.

FRANK M. GILLENWATERS, OF LEAVENWORTH, KANSAS, ASSIGNOR OF FORTY ONE-HUNDREDTHS TO WILLIAM R. SWEET, OF INDEPENDENCE, KANSAS, AND TWENTY PER CENT TO ARTHUR W. STANLEY, OF LEAVENWORTH, KANSAS.

AUTOMOBILE LOCK.

Application filed January 29, 1924, Serial No. 689,383. Renewed May 31, 1928.

This invention relates to a lock for automobiles, whereby the propelling mechanism of said automobile may be locked against movement during the absence of the driver.

An object of the invention is to provide electric operated means for locking the vehicle, and placing the switch that controls the electric locking means somewhere on the vehicle out of sight, so that the location thereof may only be known by the owner or driver of the vehicle.

A further object of the invention is to provide an electric operated locking means having the locking structure and the wires leading to the same inclosed in a casing to prevent unauthorized persons from tampering with the same.

A still further object of the invention is to provide locking means upon the propelling mechanism of a vehicle, that will necessitate a supply of electric current to unlock the same and in the absence of the electric current the locking means will engage the propelling mechanism and prevent movement of the vehicle.

With the foregoing and other objects in view, which will be apparent as the description proceeds, the invention resides in the construction and arrangement of parts, as herein after described and claimed, it being understood that changes can be made within the scope of what is claimed, without departing from the spirit of the invention.

The invention is illustrated in the accompanying drawings, wherein

Figure 1 is a longitudinal section through an automobile showing my improved locking means applied.

Figure 2 is a section taken on line 2—2 of Figure 1.

Figure 3 shows a section taken on line 3—3 of Figure 2.

Figure 4 is a section taken on line 4—4 of Figure 3, and

Figure 5 shows a section taken on line 5—5 of Figure 1.

Referring to the drawings in detail, A represents an automobile, having the usual engine B for driving the rear wheels C by means of the drive shaft D inclosed in the housing E.

Between the differential F and the drive shaft housing E is secured a pair of casings 6 and 7 riveted or bolted together as at 8 to form a housing for inclosing the means for locking the drive shaft D. At the top of the casings 6 and 7 in the interior thereof are provided downwardly projecting lugs 9 and 10 having recesses 11 and 12 arranged in their abutting faces for receiving a pair of locking arms 13 and 14. Extending towards each other in each recess 11 and 12 are a pair of pins 15 and 16 adapted to align with the pair projecting from the opposite recess, for providing pivots for the arms 13 and 14.

The arms 13 and 14 have lugs 17 and 18 provided on their inner sides for engaging in longitudinal recesses 19 and 20 formed in the driving shaft D for locking the same against rotation. The arms 13 and 14 are arranged around the drive shaft D and have their lower ends arranged with pivotal connections as at 21 and 22 to the cores 23 and 24 of electromagnets 25 and 26, which are adapted to move said arms out when said electromagnets are energized. Secured to the lugs 9 and 10 are leaf springs 27 and 28 which extend downwardly and engage the arms 13 and 14 to force the same inwardly when the electromagnets 25 and 26 are deenergized. Each of the casings 6 and 7 has a pair of upwardly projecting supporting lugs 29 and 30 for holding the electromagnets therebetween. The casing 6 has a tubular portion 31 extending therefrom, the outer end of which is bolted to the drive shaft housing E and has an annular flange 32 thereon, which in turn has an arcuate opening 33 therein. The lower end of said opening 33 registers with a passageway 34 provided in the lower wall of the tubular extension 31. Wires 35 which are connected to said electromagnets 25 and 26 pass through these openings 34 and 33. From the upper end of the opening 33 the wires 35 pass through a tube 36 which is secured in an arcuate groove 37 formed in an arm 38 projecting from the side of the annular flange 32 formed on the tubular extension 31.

The tube 36 is turned up as at 39 to telescopically receive a tube 40 which is secured to the frame of the automobile as at 41. The tube 40 then extends up into the body of the machine and is concealed and out of sight.

It can be seen that by the telescoping of the tube 40 into the upturned portion 39 of the tube 36 that upward and downward movement of the drive shaft with relation to the body is taken care of.

The wires 35 after leaving the tube 40 have a connection with one of the wires which lead to the headlights, horn, or any other wire which supplies current. As a matter of illustration they are connected to the fuse box G. The wires then lead to an electric switch 42 which may be located under the dashboard such as illustrated, or in the upholstering of the car, or in any other place on the car where the switch will be concealed and within reach of the driver of the vehicle.

My improved lock can also be located upon the rear end of the crank shaft of the engine B such as illustrated at 43 to lock the engine against turning movement, and yet allow the car to be moved as is required by law in some cities. In this form the wires 44 extend up and are connected to the source of current and the switch 42.

By inclosing the locking means and the wires 35 in casings, so that the same cannot be tampered with and by having electromagnets arranged for holding the locking arms in unlocked position, it can be seen that the current is broken when the car is locked and thus making it necessary for a thief to find the concealed switch to operate the same for energizing the electromagnets to disengage the locking arms to unlock the car.

In operation, when the driver of a vehicle wishes to leave his car and lock the same, he operates the switch 42 which will break the current being supplied to the electromagnets 25 and 26 thus deenergizing the same and allowing the arms 13 and 14 to be forced inwardly by the springs 27 and 28 until the lugs 17 and 18 engage in the slots or recesses 19 and 20 formed in the drive shaft, thus preventing the same from rotating. As soon as the coils of the magnets 25 and 26 are energized or excited by electric current, the cores 23 and 24 are moved to positions to spread the lugs 17 and 18 and disengage the drive shaft to allow the same to rotate, as the magnetic centers of the magnets 25 and 26 are arranged to cause proper movement of the cores when the magnets are energized.

Having thus described the invention, what is claimed as new is:

1. In a device of the character described in combination with a propelling shaft, of a pair of casings about said shaft, lugs carried by said casings at their abutting portions extending inwardly therefrom and having recesses therein at their abutting portions to form one large recess, a pair of pins carried by each lug which extend inwardly and into said recess, the pins upon one lug being aligned with the pins upon the opposite lug, a pair of locking arms adapted to be received in said recess and pivoted upon said aligned pins, and means upon said arms for engaging said propelling shaft for preventing rotation thereof.

2. In a device of the character described in combination with a drive shaft and a body, of a casing about said drive shaft, a pair of locking arms pivotally connected to said casing and adapted to engage the said shaft for locking the same, an electromagnet connected to each of said arms for operating the same, a tube extending from said casing upon said drive shaft to said body, electric wires adapted to be received in said tube, and a switch mounted on said body and connected to said wires.

3. In a device of the character described in combination with a body and a drive shaft, of a casing about said drive shaft, a pair of locking arms pivotally connected to said casing adapted to engage said shaft for locking the same, an electromagnet connected to each of said arms for operating the same, a tube extending from said casing upon said drive shaft to said body, said tube having telescoping means therein between the body and the drive shaft, electric wires adapted to be received in said tube, and a switch mounted on said body and connected to said wires.

In testimony whereof, I have affixed my signature.

FRANK M. GILLENWATERS.